United States Patent [19]
Lewis

[11] 4,098,341
[45] Jul. 4, 1978

[54] ROTATING BLOWOUT PREVENTER APPARATUS

[75] Inventor: George E. Lewis, Arcadia, Calif.

[73] Assignee: Hydril Company, Los Angeles, Calif.

[21] Appl. No.: 772,355

[22] Filed: Feb. 28, 1977

[51] Int. Cl.² .................. E21B 43/00; E21B 33/06
[52] U.S. Cl. .................. 166/314; 175/195; 251/1 B; 277/31
[58] Field of Search ............ 166/314, 0.5, 0.6; 175/195; 277/73, 31, 81 P; 251/1 B

[56] References Cited

U.S. PATENT DOCUMENTS

| | | | |
|---|---|---|---|
| 2,222,082 | 11/1940 | Leman et al. | 175/195 |
| 3,533,468 | 10/1970 | Lewis | 166/0.5 |
| 3,561,723 | 2/1971 | Cugini | 251/1 B |
| 3,589,667 | 6/1971 | Lewis | 251/1 B |
| 3,741,295 | 6/1973 | Murman et al. | 166/0.6 |

FOREIGN PATENT DOCUMENTS

| | | | |
|---|---|---|---|
| 471,732 | 6/1937 | United Kingdom | 277/73 |
| 523,167 | 8/1976 | U.S.S.R. | 251/1 B |

Primary Examiner—James A. Leppink
Attorney, Agent, or Firm—William W. Haefliger

[57] ABSTRACT

Rotary blowout preventer apparatus includes:

(a) an upright tubular body adapted to receive an annular packer to be constricted about a rotating well element, (b) and a rotary annular assembly carried in the body to rotate relative thereto and with the packer when the packer is constricted about said rotating element, said assembly including an actuator movable in the body to effect said constriction of the packer, (c) said assembly also including an annular head member having a shoulder located to receive vertical thrust exerted by the packer when the actuator effects constriction thereof.

33 Claims, 18 Drawing Figures

ROTATING BLOWOUT PREVENTER APPARATUS

BACKGROUND OF THE INVENTION

This invention relates generally to oil and gas well blowout prevention; more specifically, it concerns significant improvements in well blowout preventers and control systems therefor.

Well blowout preventers are constructed to close about pipe in a well in order to block upward flow or escape of well fluid at high, i.e. blowout, pressures. The pipe may desirably be rotating during such closure, and unless the preventer also rotates at the same rate, it is subject to undesirably rapid wear at the surface of engagement with the pipe, and requires replacement at frequent intervals. Attempts to resolve this problem have not provided the unusual combination of advantages in instruction, modes of operation and results as are now afforded by the present invention.

SUMMARY OF THE INVENTION

It is a major object of the invention to provide a rotating blowout preventer construction, and control system therefor, having unusual advantages and overcoming prior problems, as referred to.

Basically, the blowout preventer apparatus comprises (a) an upright tubular body adapted to receive an annular packer to be constricted about a rotating well element, (b) and a rotary annular assembly carried in the body to rotate relative thereto and with the packer when the packer is constricted about said rotating element, the assembly including an actuator movable in the body to effect said constriction of the packer, (c) the assembly also including an annular head member having a shoulder located to receive vertical thrust exerted by the packer when the actuator effects constriction thereof.

As will appear, the rotating assembly may also include a piston member associated with or part of the actuator, and also an annular piston guide member having telescopic interfit with the piston and forming with it an annular, pressure receiving, packer closing chamber, in axially spaced relation from the head member.

Further, fluid type thrust bearing means are preferably provided above and below the rotating assembly so as to float the assembly in supported relation, axially, during closing of the packer upon a rotating well pipe, so as to minimize wear and friction; further, the pressurized fluid employed by the thrust bearings is contained as by leaking seals allowing controlled lubrication of guide bearings for the rotating assembly.

Additional objects include the provision of a control system by which the actuating fluid for closing the preventer is also employed to pressurize the fluid type thrust bearings.

Additional advantages and results include the following:

The new preventer may be opened to withdraw or enter tools and may be closed on anything in the hole, or can make a complete shutoff in case the tools are out of the hole. It will be capable of rotation while containing much higher well pressure then currently possible. Reverse circulation of drilling mud will be possible with more complete removal of the cuttings. Reverse circulation then becomes more of a standard practice instead of an emergency measure.

The rotary preventer can be used subsea with remote controls, and the conventional riser can be eliminated. When drilling in deep water, flotation systems are presently needed to support the weight of the riser. Using a rotary blowout preventer, the returns can be brought back to the drilling vessel through a hose or pipe. The latter, being smaller in diameter then a riser pipe will provide higher mud velocity and better transport of the cuttings. Also, the smaller diameter mud return line will reduce the lateral forces produced by subsea currents. Further, the rotary preventer will provide full opening for entering and withdrawing tools into and out of the well bore.

These and other objects and advantages of the invention, as well as the details of an illustrative embodiment, will be more fully understood from the following description and drawings, in which:

DRAWING DESCRIPTION

FIG. 1a is an enlarged fragmentary vertical elevation illustrating a portion of the FIG. 1 assembly;

FIGS. 3–10 are enlarged fragmentary cross sections of seals shown in FIGS. 1 and 1a;

FIG. 11 is a schematic illustration of an hydraulic control system embodying the preventer shown in FIGS. 1 and 1a;

DETAILED DESCRIPTION

Figure 1:
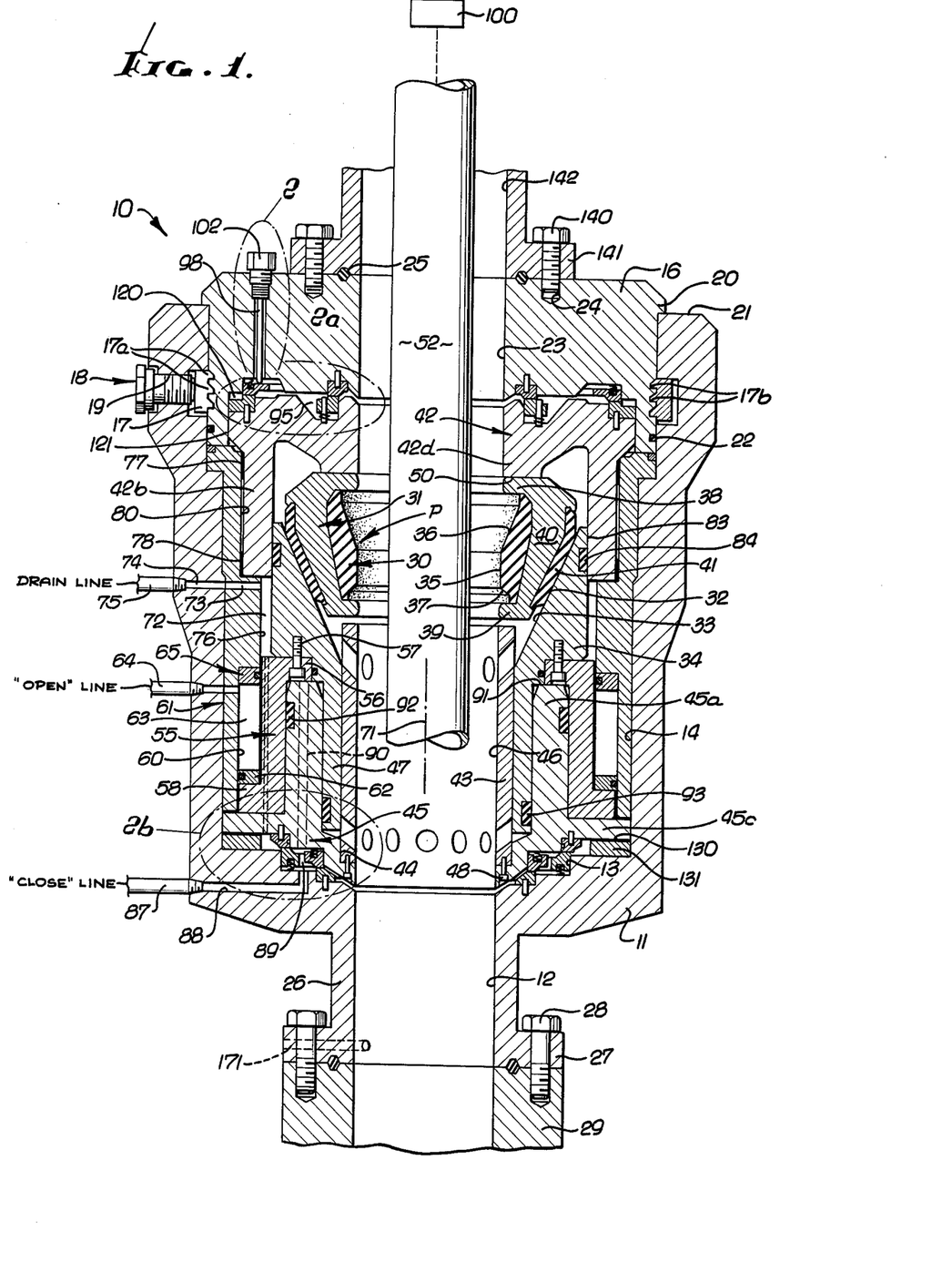
FIG. 1 is a vertical elevation, taken in section, showing a blowout preventer assembly embodying the invention.

Referring first to FIGS. 1 and 1a, the illustrated well blowout preventer apparatus generally indicated at 10 includes a body or body member 11, having concentric bores 12–14, which are of progressively increasing diameter. Cap 16 is releasably retained to the body to form a part thereof as by a jaw (or multiple circularly spaced jaws) 17 in such a position that the cap flange 20 engages the upper end 21 of the body. A retainer 18 has threaded connections with the body at 19 to laterally or radially displace the jaw, urging the teeth 17a of the jaw into meshing engagement with annular grooves 17b in the cap, thereby retaining the cap to the body. Conversely, the teeth disengage such grooves to release the cap for removal when the retainer 18 is rotated to radially back out from the position shown. The cap and body are packed off at 22. The cap has a bore 23 which is of the same diameter and is coaxial with body bore 12. Sunk in the upper face of cap 16 are threaded holes 24 to receive bolts 140 holding a flange 141 of tubular equipment, as in a stack, to the blowout preventer. The coaxial bore of such equipment is indicated at 142. An annular upper groove in the upper face of cap 16 receives a sealing ring 25 for sealing engagement with flange 141.

The lower neck 26 of body member 11 has an attachment flange 27, whereby connection is made as by bolts 28 to the mating flange 29 or other suitable fitting of stack equipment below the body.

Received within the body 11 is an annular packer P, as for example is described in U.S. Pat. Nos. 3,533,468 and 3,741,295. The packer includes a molded annulus 30 of elastomeric material (as for example rubber), and a series of rigid, rubber-flow control elements 31. The latter may take various forms, and they are individually movable bodily with the rubber in its movement of contraction and expansion. Taken together, the elements 31 may be considered as a radially expansible and contractible armature embedded and bonded within annulus 30.

Molded annulus 30 has an outer conical face 32 which is complementary to the bore 33 of an actuator 34. Also, the packer has a bore that includes a central, substantially cylindrical portion 35, and oppositely inclined upper and lower portions 36 and 37, respectively. The outward flare in each case is toward the associated end of the annulus.

It will be seen that each element 31 comprises top and bottom plates 38 and 39, respectively, rigidly connected by vertical rib 40. Elements 31 which may be of steel, bronze, or any other suitable rigid material, are preferably positioned in the rubber at the time of molding and, preferably, the rubber and the elements are bonded together by the use of suitable adhesive during the molding process. The plates of the control elements are sectorial in shape, as viewed in plan, and are arranged in a circular series, with spaces left between the opposing side edges of the plates, both top and bottom. The plates are so sized that the two opposed side edges of adjacent elements are spaced apart, it following that as the elements move radially inward, the spaces between these will diminish to form a line contact from end to end of the plates. This will prevent the rubber which will flow during the constriction of the annulus from being pinched off at the radially inward ends of the plates.

The annulus 30 is molded so its outer annular portion 41 projects radially outward beyond the ribs 40. For purposes of later description, annular portion 41 is considered as being that portion which extends radially from face 32 to the outer faces of ribs 40.

The packer is lowered, while hold-down head means 42 and cap 16 are elevated, the annulus 30 nicely fitting the upper portion of bore 32 without requiring appreciable radial constriction of the annulus. For positively limiting the downward movement of the annulus, a stop is provided in the form of tube 43, which is retained in a bore 44 formed by a piston guide member 45. The upper end of the tube provides the packer stop. The bore 46 of this tube is of the same diameter as bores 12 and 23, and the tube is spaced inwardly from the depending sleeve portion 47 of actuator wedge-portion 34. The tube is retained endwise by bolts 48.

When head means 42 is secured in place, its horizontal under-surface 50 provides a stop for limiting upward movement of the packer, the upper plates 38 of control elements 31 sliding against this surface as the packer is radially constricted or expanded. The under-surface 50 and the upper end of tube 43 thus form vertically spaced stops which prevent appreciable vertical movement of the packer with relation to the body member 11.

In accordance with an important aspect of the invention, a rotary annular assembly is carried in the body 11 to rotate relative thereto, and with the packer, when the packer is constricted about a rotating well element, as for example drill pipe indicated at 52. That assembly may be considered to include the annular head means or member 42 which provides the shoulder 50 located to receive vertical thrust exerted by the packer P when the actuator 34 moves upwardly to effect packer constriction. In this regard, the actuator 34 is also rotatable with the packer P. The latter is typically rotated by the rotating drill pipe when constricted against same, and the fact that the head means 42 and the actuator 34 are also rotatable with the packer P during their engagement with the packer facilitates packer rotation with the drill pipe to the end that wear of the elastomer material engaging the pipe is minimized. Structure at the surface to rotate pipe 52 is indicated at 100.

The actuator may be considered to include an annular piston member 55 having an interior upper flange 56 bolted at 57 to the actuator member 34, to become integral therewith. Member 55 also has an exterior flange 58 at its lower end and which is vertically reciprocable in bore 60 of body insert or sleeve bearing 61. Seal structure 62 at the upper side of flange 58 includes seal ring 61a and retainer ring 61b bolted to the flange, as better seen in FIG. 1a at 61. Fluid pressure admitted to chamber 63 above flange 58, via line 64 and ports 64a and 64b displaces the piston 55 and the actuator member 34 downwardly, allowing the packer P to open by resilient radially outward expansion. In this regard, similar seal structure 65 is provided at the upper end of chamber 63, and includes seal ring 65a and retainer ring 65b bolted to non-rotary insert or sleeve bearing 61 at 66. Seals 67 and 68 carried by rings 61a and 65b respectively engage bore 60 and sleeve bearing material 69 on the outer wall of piston member 55 to contain pressure in chamber 63.

It will be noted that the piston member 55 is rotatable with member 34 and the packer P, and bearing means is provided to center the piston member for such rotation. Such bearing means may include insert 61, and/or bearing material 69, and/or bearing material 70 on the outer side of flange 58 and also engageable with bore 60 as the flange rotates. Rotation is about the vertical axis 71 defined by the body 11.

As the piston member 55 moves upwardly, any liquid drainage accumulation in chamber 72 is exhausted via drain ports 73 and 74 and line 75. Chamber 72 is defined between bore 76 of insert 61, the outer side 34a of actuator 34, the upper end 55a of piston 55, and the lower end 42a of head member skirt 42b. Such drainage may occur as via gravitating liquid lubrication of bearing material 77 and 78 on the outer wall of skirt 42b, and 79 at the lower end of that skirt. Such bearing material engages the bore 80 of insert 61 and upward facing shoulder 81 thereof, for guiding and centering the head member 42 which will rotate with the packer P during closing thereof about rotating pipe 52 and upward thrust transmission from the packer plates 38 to the head member boss 42d. Note that the head member 42 has telescopic interfit with the actuator at locus 83, and a seal is provided therebetween at 84; therefore, the head member and actuator are mutually coaxially centered, for precise interaction with the packer P during opening and closing thereof, as well as rotation therewith and transmission of forces from the actuator through the packer and to the head member.

Closing of the packer P is effected in response to fluid pressure transmission via line 87, port 88, space 89, elongated vertical port 90 in vertically elongated boss 45a of piston guide member 45 to pressure chamber 91 at the underside of flange 56. Annular member 45 is also rotatable with the actuator member. Note seal 92 packing off between boss 45a and piston member 55, and seal 93 packing off between boss 45a and annular skirt 47 of actuator member 34 at the radially inward side of boss 45a. Boss 45a telescopically fits the piston and actuator members.

Referring again to the head member 42, upper thrust bearing means is located between the head member and the body cap 16 to receive vertical thrust transmitted by the packer P and the head member while the head member is rotating. That upper thrust bearing may comprise a pressure chamber 95, seen in FIGS. 1 and 2a, and means is provided to supply fluid lubricant under pressure to chamber 95. The lubricant or hydraulic fluid supply means may advantageously take the form of a valve openable to pass pressurized lubricant to the chamber in response to upward bodily displacement of the head member during upward travel of the piston member to constrict the packer. See for example the valve body 96 in FIG. 2 that lifts off seat 97 in response to upward displacement of valve rod 98 integral with the body 96 and depending via port 99 to terminate at 98a in chamber zone 95a formed as an upward recess in cap 16. A compression spring 101 urges the valve body 96 against seat 97. A valve housing 102 thread connected at 103 into the cap 16 houses the valve body 96, spring 101, and seat ring 104 forming seat 97. Line 105 delivers pressurized lubricant from a source 106 to the housing interior 102a.

Seal means to controllably seal off escape of lubricant (for example liquid) from chamber 95 may advantageously include pairs of annular seal elements spaced at radially inner and outer sides of the thrust bearing means, each pair of seal elements including one element rotating with the head member and another element that is non-rotary and is carried by the body 11. In the example shown in FIGS. 1 and 2a, a first such pair of seal elements appears at 107 and 108, and a second such pair at 109 and 110. Elements 108 and 110 of the pairs rotate with the head member 42, and elements 107 and 109 are non-rotary. Elements 108 and 109 are respectively staked at 111 and 112 to the head and cap; element 107 is urged by spring 113 toward element 108; and element 110 is urged by spring 114 toward element 109. Interengaged sealing surfaces 107a and 108a are carried by elements 107 and 108, and interengaged sealing surfaces 109a and 110a are carried by elements 109 and 110. Seals carried by the elements to engage cap and head structure appear at 115–118. Pressurized lubricant leaking past surfaces 109a and 110a into the bore area 119 communicating with well fluid prevents ingress of grit in such well fluid into chamber; therefore, the fluid pressure in chamber 95 is kept above well pressure at zone 119. Lubricant leaking past surfaces 107a and 108a flows via passages 120 and 121 to and past bearings 77, 78 and 79, lubricating same, and draining to collection chamber 72 as previously described.

Figures 2, 12:
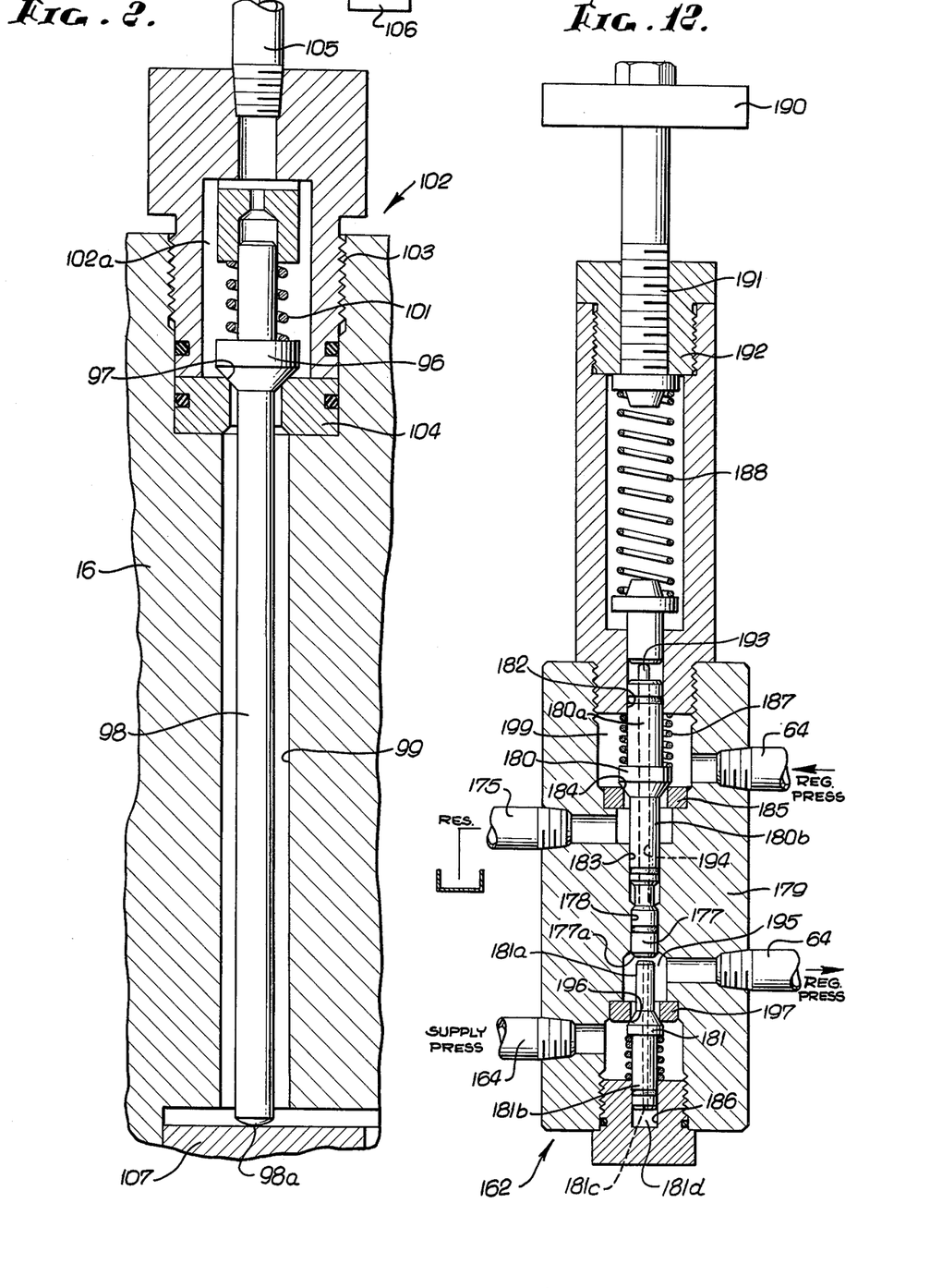
FIGS. 2, 2a, and 2b are enlarged fragmentary vertical sections showing in detail those portions of FIG. 1 designated by the outlines 2, 2a and 2b in FIG. 1.
FIG. 12 is an enlarged vertical section taken through a regulator valve appearing in the FIG. 11 system.
Figure 2A:
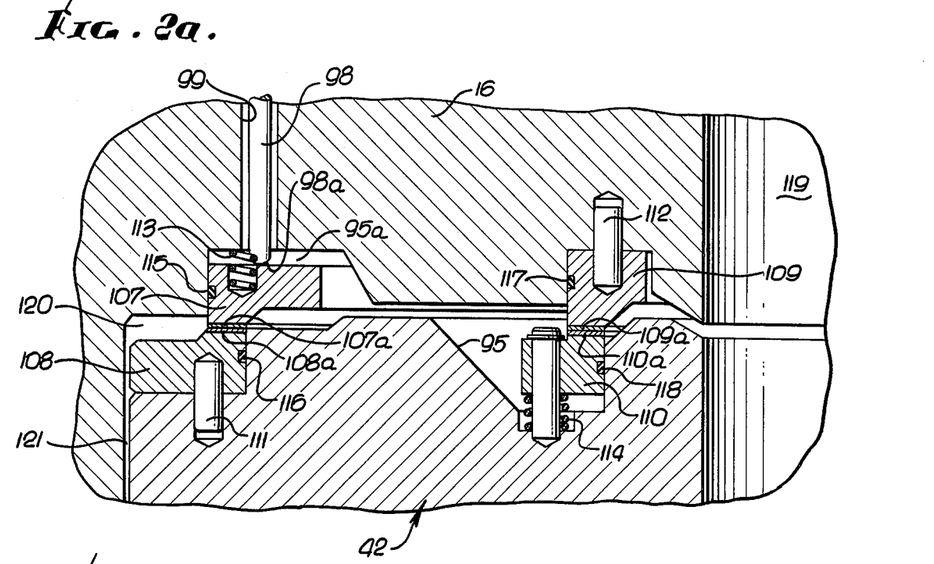
Figure 2B:
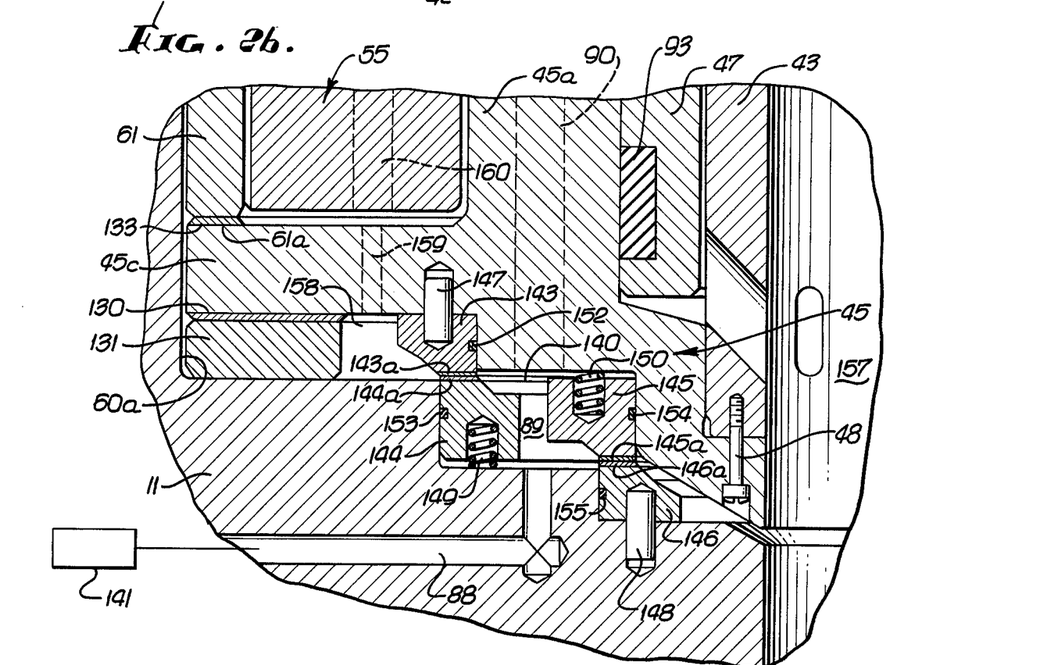
Figure 3:
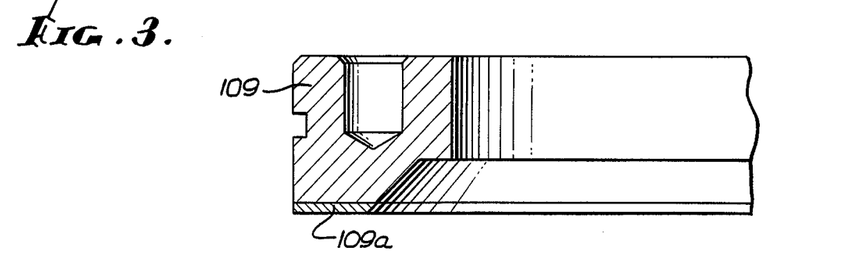
Figure 4:
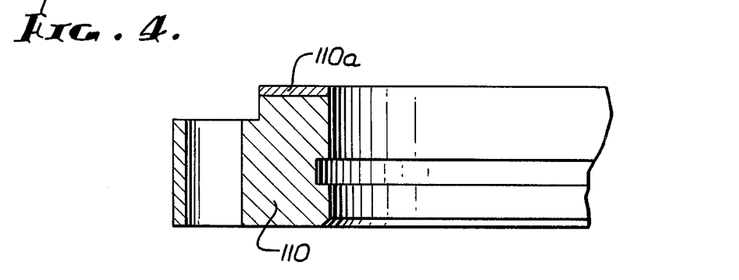
Figure 4A:
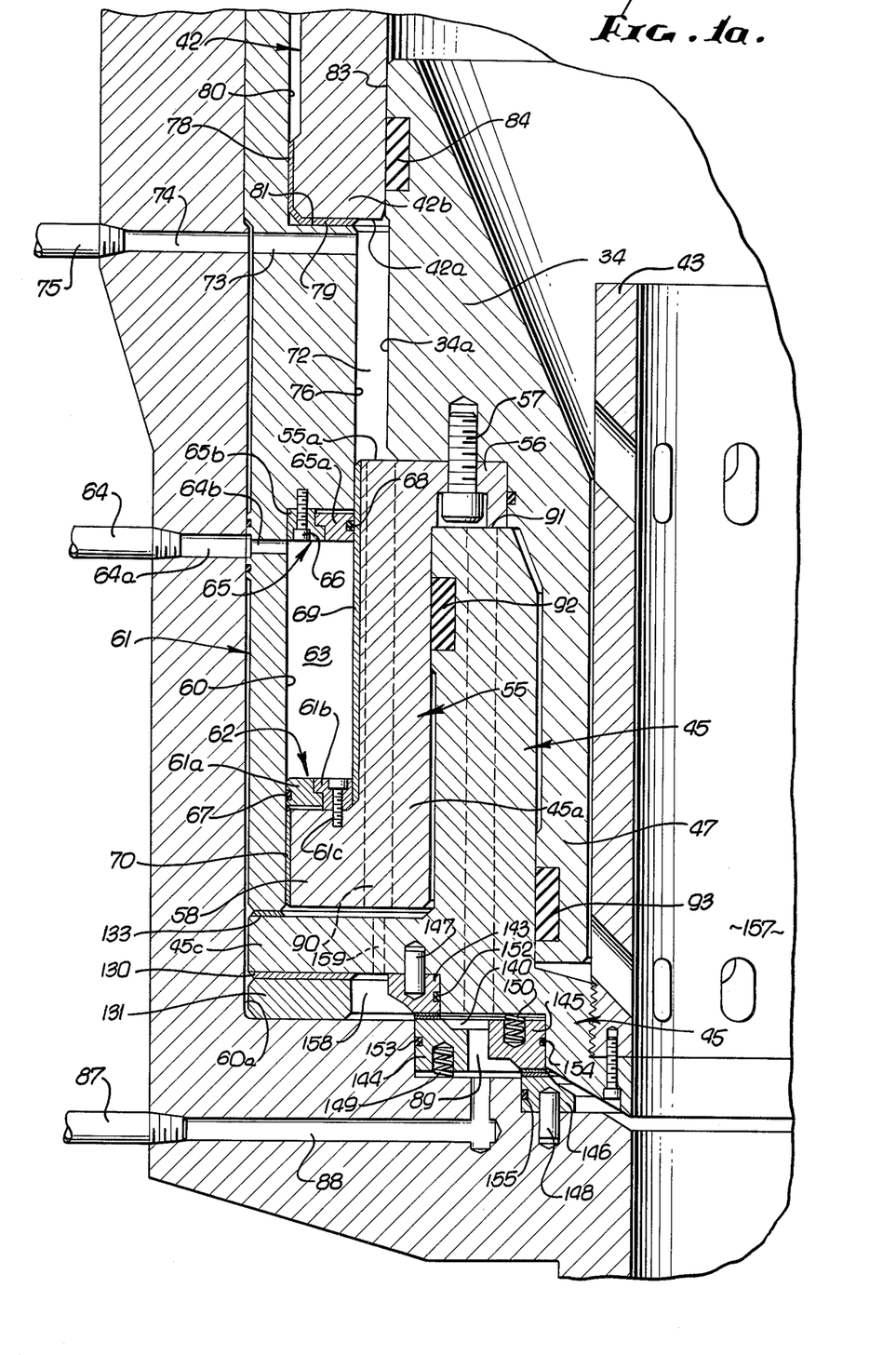
Figure 5:
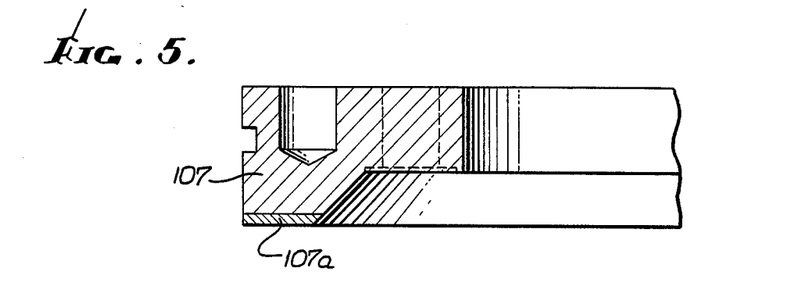
Figure 6:
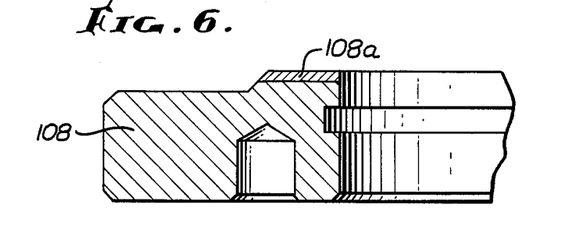
Figure 7:
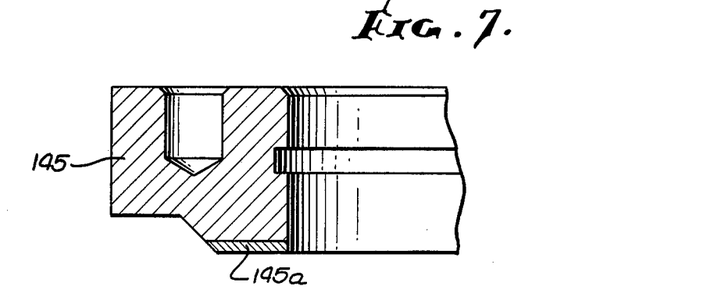
Figure 8:
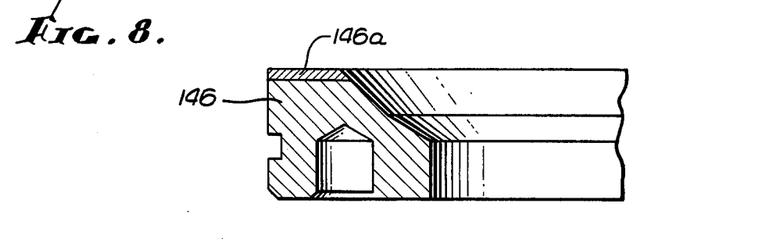
Figure 9:
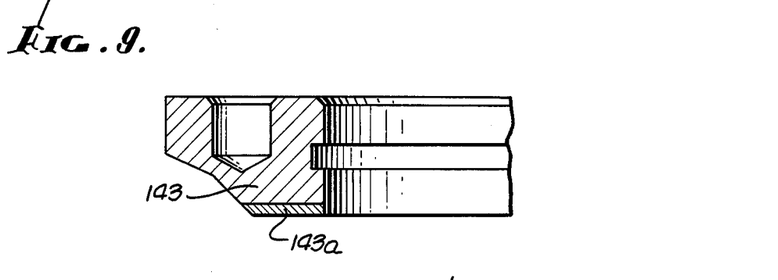
Figure 10:
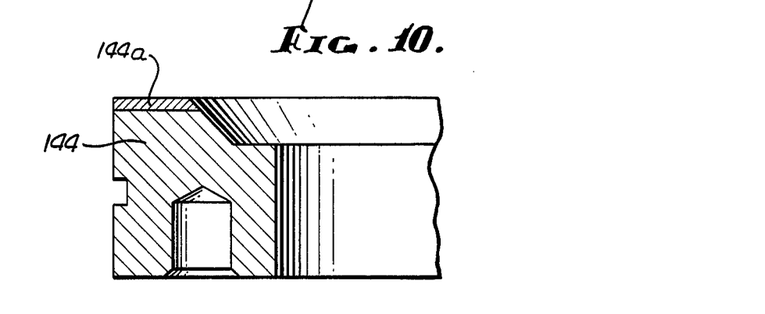

Referring now to FIGS. 1 and 2b, lower thrust bearing means is located between the piston guide member 45 and the body to receive vertical (downward) thrust transmitted by member 45, while that guide is rotating and while packer closing fluid pressure is connected to closing chamber 91, i.e. downwardly on the top of the boss 45a.

Such lower thrust bearing means advantageously comprises a pressure chamber 140 seen in FIGS. 1 and 2b, and means is provided to supply pressure fluid to that chamber. The fluid lubricant pressure supply means may include the closing fluid pressure source 141, line 87 and ports 88 and 89 previously described. Note that such pressure is supplied during closing pressure application to the closing chamber. Seal means to controllably seal off escape of lubricant from lower chamber 140 may advantageously include pairs of annular seal elements spaced at radially inner and outer sides of the chamber 140. A first pair of such seal elements appears at 143 and 144, and a second pair at 145 and 146. Elements 143 and 145 rotate with piston guide member 45, and elements 144 and 146 are non-rotary. Elements 143 and 146 are respectively staked at 147 and 148 to member 45 and body 11; elements 144 is urged by spring 149 toward element 143; and element 145 is urged by spring 150 toward element 146. Interengaged sealing surfaces 143a and 144a are carried by elements 143 and 144; and interengaged sealing surfaces 145a and 146a are carried by elements 145 and 146. Seals carried by the elements appear at 152–155. Pressure lubricant leaking past surfaces 145a and 146a into the bore area 157 communicating with well fluid prevents ingress of grit and sand in such well fluid into chambers 89 and 140. Lubricant leaking past surfaces 143a and 144a flows into chamber 158. It then lubricates a bearing surface 130 on a flange 45c on member 45, surface 130 rotatably engaging a thrust ring 131 received in body bore 60a. Also lubricated is a bearing surface 133 carried at the upper side of that flange to engage the lower end 61a of sleeve 61. Such bearing surfaces facilitate in-place rotation of member 45. Lubricant collecting in chamber 158 may rise via ports 159 and 160 toward drain zone 72 and drain ports 73 and 74.

It will be noted that the lower pressure chamber 140 preferably has an effective cross-sectional area approximately equal to that of the closing chamber 91, such areas being measured in planes normal to axis 71. As a result, the net vertical force on the piston guide member 45 is minimized, and the rotating elements or "inner assembly" will float between the upper and lower thrust bearings.

FIGS. 3–10 show details of the seal elements previously described.

FLUID PRESSURE CONTROLS

Figure 11:
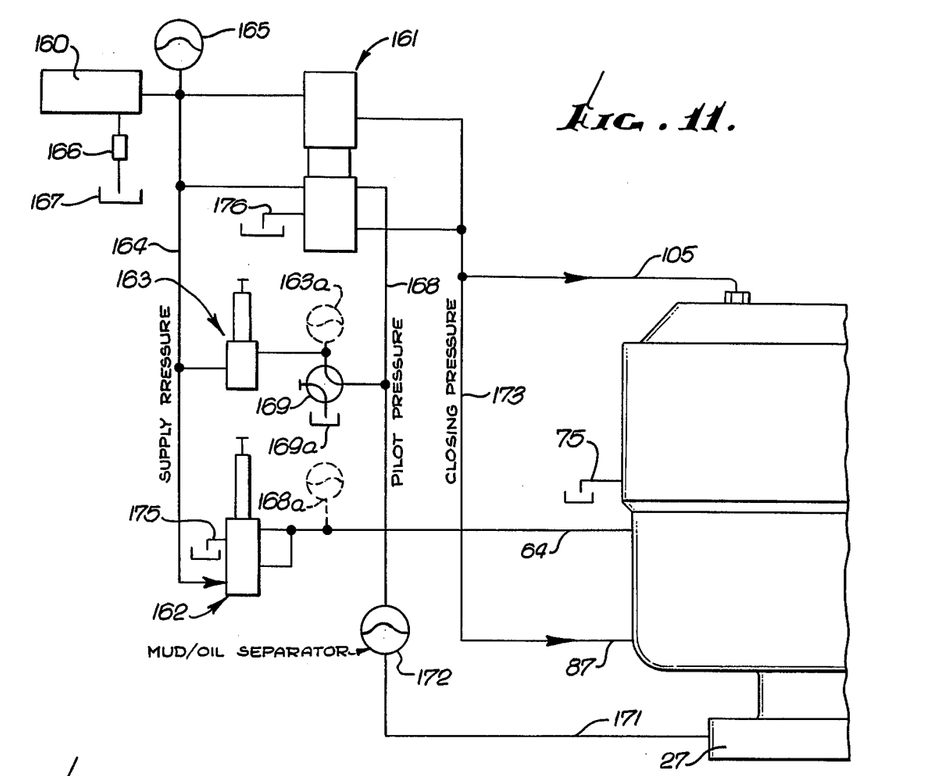

The fluid pressure control system to controllably supply pressure to lines 64, 87 and 105 previously described is shown in FIG. 11. That system basically includes a pump 160, a pilot operator pressure control valve 161 (see FIG. 13), a pressure regulating valve 162 (see FIG. 12) and a pressure reducing valve 163. In FIG. 11, pressure from pump 160 is supplied to a supply pressure manifold 164 to which an accumulator 165 is connected to store pressure. Filter 166 and reservoir 167 are shown at the inlet side of the pump. A pilot pressure manifold is shown at 168, and is connected to valve 161, to a three-way control valve 169 and to the well bore via body flange 27, line 171 and mud/oil seperator 172. A closing pressure manifold is shown at 173, and is connected to valve 161 and lines 87 and 105. Line 64 is connected to regulator valve 162.

Manifold 164 is also connected to valve 161, to valve 162 and to valve 163. Valve 162 has a reservoir connection at 175, as does valve 161 at 176. Accumulator 163a may be used to stabalize the pilot pressure supplied from reducing valve 163, while accumulator 162a may be use to stabilize the opening pressure supplied from regulator valve 162.

Referring to FIG. 12 and regulator valve 162, a floating piston 177 is shiftable endwise in bore 178 of housing 179 between a venting valve 180 and a charging valve 181 both of which are of poppet type. Venting valve 180 has two oppositely extending stems 180a and 180b slidable in housing bores 182 and 183, and the conical surface of valve 180 seats at 184 in a seat ring 185. Charging valve 181 has two oppositely extending stems 181a and 181b, the latter slidable in housing bore 186. The conical surface of valve 181 seats at 196 in a seat ring 197. A spring 187 urges valve 180 toward seated position. Another spring 188, the tension of which is adjustably controlled by handle 190 threaded at 191 into housing cap 192, urges a plunger 193 toward piston 177, via a bore 194 through valve 180 and its associated stems.

In operation, the end 177a of the piston is exposed to regulated pressure in chamber 195 in the housing 179, the piston located directly between stems 180b and 181a. When the "set" regulating pressure is obtained, the downward force of spring 188 is equal to the upward force on the piston resulting from the pressure in chamber 195, which is the fluid pressure communicated to the "opening" chamber of the blowout preventer, keeping piston 55 down. If the pressure in chamber 195 falls below "set" pressure, the spring force will urge rod 193 downwardly forcing the piston 177 down to displace stem 181a down to unseat valve 181, opening same to increase the pressure in chamber 195 via supply pressure delivery from manifold 164. If the pressure in chamber 195 exceeds the set pressure, springs 188 and 187 are overcome, valve 180 lifts off its seat, and the excess pressure will be dumped via line 175. Manifold 64 also connects to the chamber 199 at the upper side of valve 180 to deliver fluid pressure to be dumped past valve 180 (when unseated) to line 175. Hole 181c through valve 181 serves to balance the pressure between chambers 195 and 181d. Spring 181e provides force to urge valve 181 into seating position.

Figure 13:
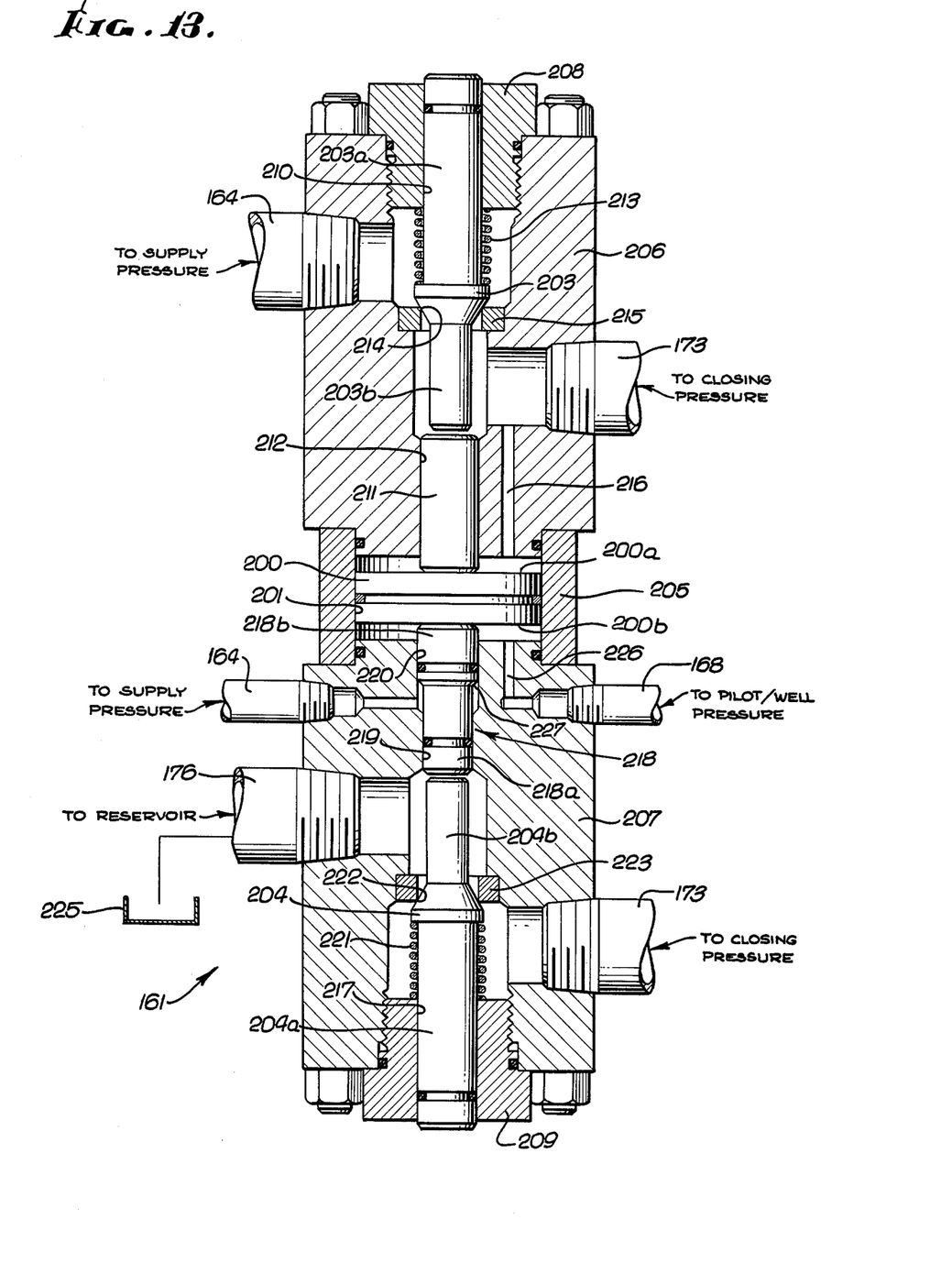
FIG. 13 is an enlarged vertical section taken through a pilot operator pressure control valve appearing in the FIG. 11 system.

Referring to FIG. 13, and the pilot operated pressure control valve 161, a floating piston 200 is shiftable endwise in a bore 201 between a charging valve 203 and a vent valve 204. Bore 201 is formed in a ring 205 to which housing tubular sections 206 and 207 are attached, the opposite ends of the sections being capped at 208 and 209.

The charging valve has associated stems 203a and 203b at its opposite ends, stem 203a guiding in bore 210, and stem 203b projecting toward rod 211, which guides in bore 212 and contacts the upper side of piston 200. A spring 213 urges valve 203 against seal 214 formed by ring 215. When valve 203 is pushed off seat 214, supply pressure passes from line 164 to manifold 173. The latter also communicates with the upper side 200a of piston 200, via port 216.

The vent valve 204 has associated stems 204a and 204b at its opposite ends, stem 204a guiding in bore 217, and stem 204b projecting toward a small piston 218 whose sections 218a and 218b guide in stepped bores 219 and 220. A spring 221 urges valve 204 against seat 222 formed by ring 223. When valve 204 is unseated, closing pressure in manifold 173 is dumped to reservoir 225 via line 176. Pilot or well pressure (whichever is larger) in manifold 168 communicates with the lower side 200b of piston 200 via port 226; also, supply pressure in manifold 164 is communicated to the stepped shoulder 227 of piston 218, tending to urge it toward piston 200.

In operation, movement of piston 200 in relation to the valves 203 and 204 establishes the controlled closing pressure in the manifold 173. If the closing pressure is below the sum of pilot pressure and a delta pressure force at 227, the piston moves up to unseat valve 203 until supply pressure communicated to manifold 173 re-establishes the predetermined level; and, if the closing pressure is too high, piston 200 moves down to unseat valve 204 to cause dumping of control pressure in manifold 173 until predetermined level is reached. Either pilot pressure in manifold 168, or well pressure therein, whichever is greater, is used as the control at the underside of the piston 200. The small piston, urged up by pressure on shoulder 227, provides a biasing force communicated via the piston 218 to piston 200 urging the latter upwardly, to maintain the closing pressure in manifold 173 always greater than the well pressure in manifold 168.

Pressure reducing valve 163 maintains a minimum regulated pressure in manifold 168, so as to dominate in case the well pressure drops below such regulated pilot pressure. A three-way valve 169, connected between the output side of valve 163 and manifold 168, has a first position in which the line 168 is pressurized by the output from valve 163, and a second position in which pressure in line 168 is bled off to reservoir 169a, for effecting opening of the preventer, as via operation of valve 161, to dump the pressure in closing pressure manifold 173.

To repeat, the three-way control valve serves to charge or discharge pressure from the pilot pressure line 168. When this line is pressurized, pressure will be applied to the closing chamber tending to close the preventer. When this pressure is bled off the preventer will open. Pressure first applied to the closing chamber will be greater than the well pressure. This will force the mud/oil separator diaphragm to bottom and discharge the mud from the separator 172. Assuming the system is tight, the oil will then be contained in the pilot pressure line for energizing the pilot operated pressure control valve. These conditions will exist until the well pressure exceeds the set pressure supplied by the regulator valve. When the well pressure exceeds this pressure the pilot line pressure will equal the well pressure. The pressure reducing valve 163 will serve as a check to prevent this higher pressure from being bled off as would happen if a regulator valve were used.

Pressure in the opening line is maintained, for example, at 300 psi to insure full opening of the preventer and to provide lubrication for the radial bearings. Under conditions of high well pressure high closing pressure will be required in order to maintain lubrication of the thrust bearing seals. This will cause a greater than necessary closing force to be applied to the packing element. A counter force can be provided by increasing the opening chamber pressure to reduce the tightness of the packoff to the proper value.

Figure 14:
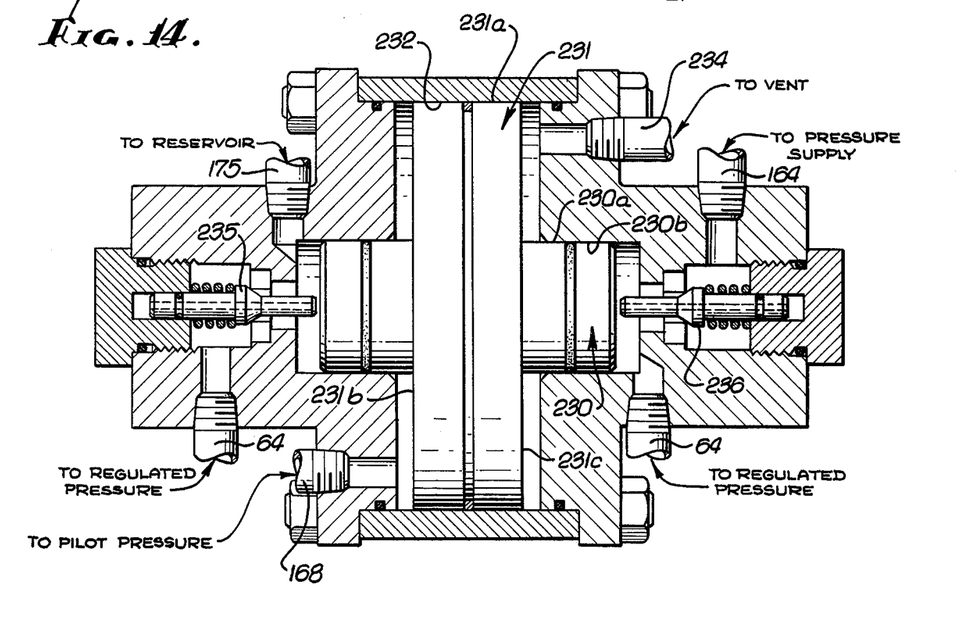
FIG. 14 is an enlarged vertical section taken through a pilot operated regulator valve appearing in the FIG. 11 system.
Figure 15:
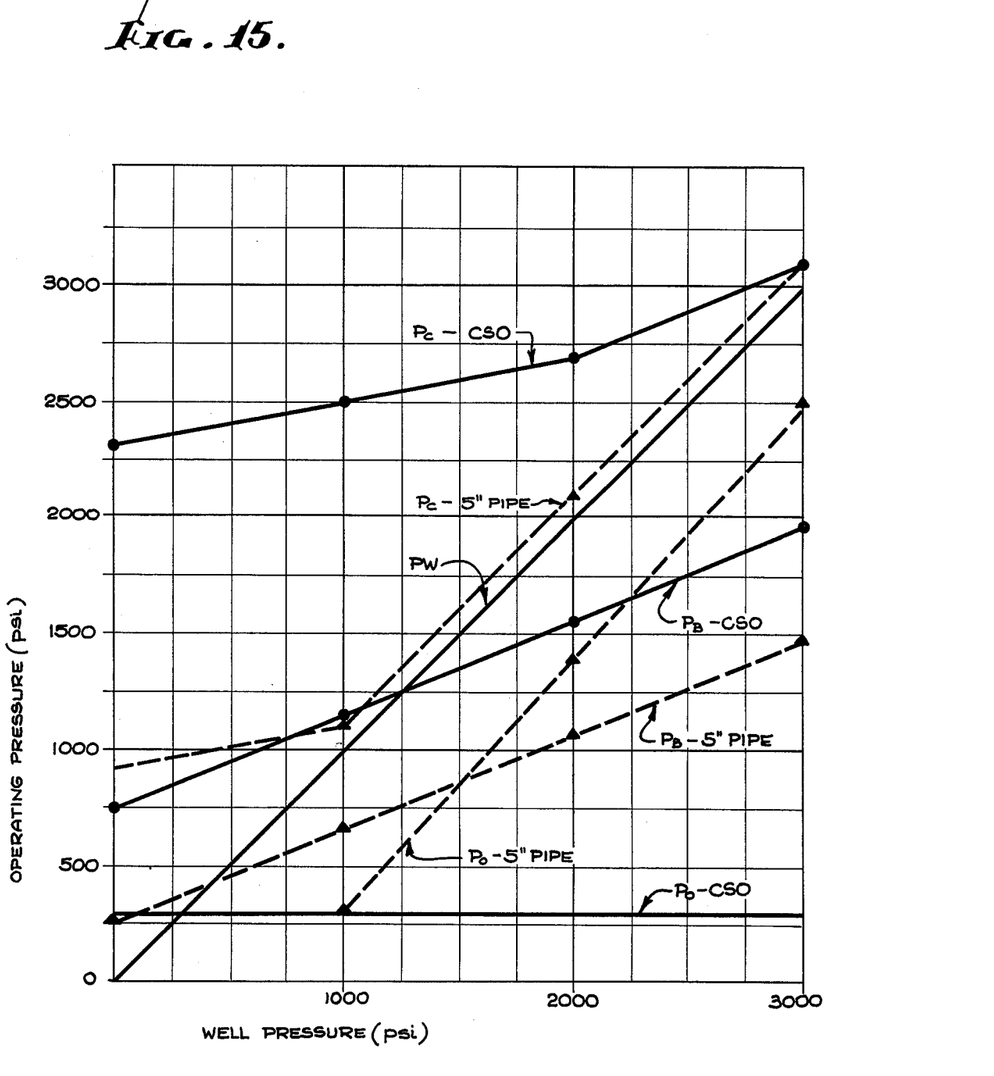
FIG. 15 is a graph of well pressure preventer closing pressure, and showing various pressure relationships as respects the system of FIG. 11.

Approximate required closing and opening pressure to secure a packoff on open hole and 5 inches O.D. pipe at various well pressures are shown on the FIG. 15 graph. Also shown is the pressure required to float the top thrust bearing. For proper operation of the unit, the top bearing pressures must always be less than the pressure required to close the preventer. These illustrated values are theoretical, and were derived from calculated values believed to be approximately correct. The symbols used in FIG. 15 are defined as follows:

$P_c$ = Closing Pressure
$P_W$ = Well Pressure
$P_B$ = Required Pressure in Top Thrust Bearing
$P_o$ = Ideal Pressure in opening Chamber
CSO = Complete Shut Off Finally, FIG. 14 illustrates another form of regulator valve differing from FIG. 12 principally in that adjustable pilot pressure is used (rather than an adjustable spring) to control regulated pressure at 64.

The floating piston 230 is made having two diameters at 230a and 231a. The smaller piston 230 slidable in bore 230b receives the force of the regulated pressure via line 64. The larger piston 231 slidable in bore 232 receives the bias or pilot pressure at face 231b to produce a force to oppose the regulated pressure force. The side 231c of the large piston is vented to atmosphere at 234. Valves 235 and 236 correspond to FIG. 12 valves 180 and 181, respectively. With this construction, a lower pilot pressure may be used to control a higher regulated pressure. In operation, excess regulated pressure will force open the venting valve 235 while excess pilot pressure will force open the charging valve 236. Piston movements and dimensions are controlled so that only one valve can be opened at a time.

Each of these valve forms of FIGS. 12 and 14 has its own field of application. The spring biased design of FIG. 12 would cost less to make and be better suited for use on land rigs where manual control is used and the control valves are located near the driller. Where remote control is required on land or subsea rigs, the pilot operated valve of FIG. 14 would have a distinct advantage particularly when certain automatic control features are to be used.

I claim:

1. In rotary well blowout preventer apparatus, the combination comprising
   (a) an upright tubular body adapted to receive an annular packer to be constricted about a rotating well element,
   (b) and a rotary annular assembly carried in the body to rotate relative thereto and with the packer when the packer is constricted about said rotating element, said assembly including an actuator movable in the body to effect said constriction of the packer, and a piston surface carried by the actuator,
   (c) said assembly also including an annular head member having a shoulder located to receive vertical thrust exerted by the packer when the actuator effects constriction thereof,
   (d) the assembly including a lower member extending in generally axially spaced relation to the head member,
   (e) there being a lower thrust bearing means including a chamber located between said lower member and the body to receive vertical thrust transmitted by the lower member during rotation thereof,
   (f) there being an upper thrust bearing means including a chamber located between the head member and the body to transfer vertical thrust while the head member is rotating,
   (g) and means for supplying pressurized hydraulic fluid to the upper and lower thrust bearing chambers and to said piston surface and at a pressure greater than well pressure during constriction of the packer.

2. The combination of claim 1 wherein said actuator includes a piston member defining said piston surface and movable vertically in the body, there being bearing means centering said piston member for rotation in and relative to the body about a generally vertical axis defined by the body.

3. The combination of claim 2 wherein said bearing means comprises a radial sleeve bearing between the piston member and a bore defined by the body.

4. The combination of claim 1 wherein said head member has telescopic interfit with the actuator.

5. The combination of claim 4 including bearing means centering said head member for rotation in and relative to the body about a generally vertical axis defined by the body.

6. The combination of claim 5 wherein said bearing means comprises a radial sleeve bearing between the head member and a bore defined by the body.

7. The combination of claim 4 wherein said upper thrust bearing means is located above the head member to receive vertical thrust transmitted by the head member while the head member is rotating.

8. The combination of claim 7 including seal means to controllably seal off escape of said hydraulic fluid from the upper thrust bearing chamber.

9. The combination of claim 8 wherein said means for supplying hydraulic fluid to the upper thrust bearing chamber includes a valve openable to pass pressurized fluid to the chamber in response to upward bodily displacement of the head member during upward travel of the piston member to constrict the packer.

10. The combination of claim 8 wherein said seal means includes pairs of annular pressure sealing elements spaced at radially inner and outer sides of the thrust bearing means, each pair of such elements including one element that rotates with the head member and another element that is non-rotary and is carried by the body.

11. The combination of claim 4 wherein said lower member comprises an annular piston guide member having telescopic interfit with a piston member carried by the actuator to form therewith an annular pressure receiving closing chamber, in axially spaced relation to the head member, said piston member defining said piston surface.

12. The combination of claim 11 wherein said lower thrust bearing means is located below the piston guide member to receive vertical thrust transmitted by said guide member while the guide member is rotating and while packer closing fluid pressure is communicated to the closing chamber formed between the guide member and the piston member.

13. The combination of claim 12 including seal means to controllably seal off escape of lubricant from the lower thrust bearing means.

14. The combination of claim 13 wherein said seal means includes pairs of annular seal elements spaced at radially inner and outer sides of said lower thrust bearing means.

15. In rotary well blowout preventer apparatus, the combination comprising
   (a) an upright tubular body adapted to receive an annular packer to be constricted about a rotating well element,
   (b) and a rotary annular assembly carried in the body to rotate relative thereto and with the packer when the packer is constricted about said rotating element, said assembly including an actuator movable in the body to effect said constriction of the packer,
   (c) said assembly also including an annular head member having a shoulder located to receive vertical thrust exerted by the packer when the actuator effects constriction thereof, said head member having telescopic interfit with the actuator, (d) the rotary assembly including an annular piston guide member having telescopic interfit with the piston member to form therewith an annular pressure receiving closing chamber, in axially spaced relation to the head member, (e) there being a lower thrust bearing means located between the piston guide member and the body to receive vertical thrust transmitted by said guide member while the guide member is rotating and while packer closing fluid pressure is communicated to the closing chamber formed between the guide member and the piston member, (f) the lower pressure chamber having an effective cross sectional area approximately equal to the cross sectional area of the closing chamber, said areas measured in planes normal to an axis defined by the piston member.

16. The combination of claim 13 wherein said upper thrust bearing means is located above the head member to transfer vertical thrust to the body while the head member is rotating.

17. The combination of claim 8 including bearing means centering said head member for rotation in and relative to the body, said bearing means being in communication with said seal means to receive fluid lubricant escaping therefrom.

18. The combination of claim 11 wherein the body includes a sleeve, and said piston member and sleeve form an annular pressure receiving opening chamber which is expanded when fluid pressure is transmitted thereto to effect axial movement of the piston member for relieving constriction of the packer.

19. In rotary well blowout preventer apparatus, the combination comprising (a) an upright tubular body adapted to receive an annular packer to be constricted about a rotating well element, (b) and a rotary annular assembly carried in the body to rotate relative thereto and with the packer when the packer is constricted about said rotating element, said assembly including an actuator movable in the body to effect said constriction of the packer, (c) said assembly also including an annular head member having a shoulder located to receive vertical thrust exerted by the packer when the actuator effects constriction thereof, said head member having telescopic interfit with the actuator, (d) the rotary assembly including an annular piston guide member having telescopic interfit with the piston member to form therewith an annular pressure receiving closing chamber, in axially spaced relation to the head member, (e) the body including a sleeve, and said piston member and sleeve forming an annular pressure receiving opening chamber which is expanded when fluid pressure is transmitted thereto to effect axial movement of the piston member for relieving constriction of the packer, (f) and bearing means centering the piston member for rotation in and relative to the body, said bearing means being located to receive leakage of fluid from the opening chamber for lubricating the bearing means.

20. In rotary well blowout preventer apparatus the combination comprising (a) an upright tubular body adapted to receive an annular packer to be constricted about a rotating well element, (b) and a rotary annular assembly carried in the body to rotate relative thereto and with the packer when the packer is constricted about said rotating element, said assembly including an actuator movable in the body to effect said constriction of the packer, (c) said assembly also including an annular head member having a shoulder located to receive vertical thrust exerted by the packer when the actuator effects constriction thereof, said head member having telescopic interfit with the actuator, (d) the rotary assembly including an annular piston guide member having telescopic interfit with the piston member to form therewith an annular pressure receiving closing chamber, in axially spaced relation to the head member, (e) there being a lower thrust bearing means located between the piston guide member and the body to receive vertical thrust transmitted by said guide member while the guide member is rotating and while packer closing fluid pressure is communicated to the closing chamber formed between the guide and the piston member, (f) means for supplying pressurized fluid to the lower thrust bearing means, and seal means to controllably seal off escape of said fluid from the lower thrust bearing means, (g) upper thrust bearing means located between the head member and the body to transfer vertical thrust to the body while the head member is rotating, said upper thrust bearing means comprising a pressure chamber, and said means to supply pressurized fluid to the lower thrust bearing is also located to supply pressurized fluid to the upper thrust bearing chamber and the piston closing chamber, (h) said pressurized fluid supply means including a pilot operated control valve responsive to well pressure and to the pressure of a supply source to provide a controlled closing pressure output always greater than well pressure by a predetermined amount, for application to the upper and lower thrust bearing means and the closing chamber.

21. The combination of claim 20 wherein the pressurized fluid lubricant supply means includes a pilot pressure source connected with said control valve to establish the level of said output.

22. The combination of claim 1 including seal means to controllably leak fluid under pressure at said thrust bearing means.

23. The combination of claim 20 wherein the pilot pressure source includes a pressure reducing valve connected with said source, and a pilot pressure line connected to the output of the reducing valve.

24. The combination of claim 23 including a three-way-valve connected with said pilot pressure line and having a first position in which the line is pressurized by the output from the reducing valve so that pressure will be applied from the pilot operated control valve to the closing chamber, for closing the preventer, and a second position in which pressure in said line is bled off for effecting opening of the preventer.

25. The combination of claim 18 including a source of fluid pressure, and a pressure regulator valve connected between said source and said opening chamber to maintain a predetermined pressure level in the opening chamber.

26. In rotary well blowout preventer apparatus, the combination comprising
  (a) an upright tubular body adapted to receive an annular packer to be constricted about a rotating well element,
  (b) and a rotary annular assembly carried in the body to rotate relative thereto and with the packer when the packer is constricted about said rotating element, said assembly including an actuator movable in the body to effect said constriction of the packer,
  (c) said assembly also including an annular head member having a shoulder located to receive vertical thrust exerted by the packer when the actuator effects constriction thereof, said head member haing telescopic interfit with the actuator,
  (d) a rotary assembly including an annular piston guide member having telescopic interfit with the piston member to form therewith an annular pressure receiving closing chamber, in axially spaced relation to the head member,
  (e) the body including a sleeve, and said piston member and sleeve forming an annular pressure receiving opening chamber which is expanded when fluid pressure is transmitted thereto to effect axial movement of the piston member for relieving constriction of the packer.
  (f) a source of fluid pressure, and a pressure regulator valve connected between said source and said opening chamber to maintain a predetermined pressure level in the opening chamber,
  (g) said pressure regulator valve including a housing having a bore, a floating piston in said bore, first and second seats, a first valve element urged to seat on the first seat by regulated pressure, a second valve element urged to seat on the second seat by adjustable spring pressure, the piston exposed to said regulated pressure and located to unseat the first valve if the regulated pressure drops below a predetermined level whereby supply pressure is passed by the first valve to increase the regulated pressure, and to unseat the second valve if the regulated pressure increases above a predetermined level whereby regulated pressure is passed by the second valve to discharge, thereby decreasing said regulated pressure.

27. The combination of claim 20 wherein said pilot operated control valve includes a housing having a bore, a first floating piston in said bore, first and second seats, a first valve element urged to seat on the first seat by said closing pressure, a second valve element urged to seat on the second seat by second pressure consisting of said well pressure or pilot pressure whichever is greater, the piston exposed to said control pressure and to said second pressure and configured to unseat the first valve if the closing pressure drops below a predetermined level whereby supply pressure is passed by the first valve to increase that closing pressure, and to unseat the second valve if the second pressure drops below another predetermined level, whereby closing pressure is passed by the second valve to discharge thereby decreasing said closing pressure.

28. The combination of claim 27 including an auxiliary piston in another housing bore, the auxiliary piston transmitting biasing force to the first floating piston to bias same to maintain the closing pressure always greater than the second pressure, the auxiliary piston receiving application of supply pressure acting to urge it toward the first floating piston.

29. For combination with well blowout preventer apparatus including
  (a) an upright tubular body adapted to receive an annular packer to be constricted about a rotating well element, and
  (b) an actuator movable in the body to effect said constriction of the packer, and to relieve said constriction, the actuator having a piston surface and there being a pressure receiving opening chamber in the body to which said piston surface is exposed for pressure application tending to displace the actuator to relieve said constriction, the improvement comprising a pressure regulator valve connectible in communication between a pressure source and said opening chamber, said valve including a housing having a bore, a floating piston in said bore, first and second seats, a first valve element urged to seat on the first seat by regulated pressure, a second valve element urged to seat on the second seat by adjustable spring pressure, the piston exposed to said regulated pressure and located to unseat the first valve if the regulated pressure drops below a predetermined level whereby supply pressure is passed by the first valve to increase the regulated pressure, and to unseat the second valve if the regulated pressure increases above a predetermined level whereby regulated pressure is passed by the second valve to discharge, thereby decreasing said regulated pressure.

30. For combination with well blowout preventer apparatus including
  (a) an upright tubular body adapted to receive an annular packer to be constricted about a rotating well element, and
  (b) an actuator movable in the body to effect said constriction of the packer and to relieve said constriction, the actuator having a piston surface and there being a pressure receiving closing chamber in the body to which said piston surface is exposed for pressure application tending to displace the actuator to effect said constriction, the improvement comprising a control valve responsive to well pressure or pilot pressure, and to the pressure of a supply source to provide a controlled closing pressure output always greater than well pressure by a predetermined amount, for application to the closing chamber, said valve including a housing having a bore, a first floatng piston in said bore, first and second seats, a first valve element urged to seat on the first seat by said closing pressure, a second valve element urged to seat on the second seat by second pressure consisting of said well pressure or pilot pressure whichever is greater, the piston exposed to said control pressure and to said second pressure and configured to unseat the first valve if the closing pressure drops below a predetermined level whereby supply pressure is passed by the first valve to increase that closing pressure, and to unseat the second valve if the second pressure drops below another predetermined level, whereby closing pressure is passed by the second valve to discharge thereby decreasing said closing pressure.

31. In the method of operating a well blowout preventer that includes an annular packer to be constricted about a rotating well element, the steps that include (a) constricting said packer about said element to engage the element and seal off thereabout, and
(b) allowing the packer to be rotated by and with said element during constricted engagement of the packer therewith, and
(c) applying hydraulic fluid pressure greater than well pressure to provide thrust bearings for the packer, above and below the packer.

32. The method of claim 31 wherein said constricting step includes transmitting fluid pressure to displace a piston axially thereby to displace the packer radially inwardly, 33. The method of claim 32 including the step of providing a common source for said transmitted fluid pressures.

* * * * *